US008568492B2

(12) United States Patent
May et al.

(10) Patent No.: US 8,568,492 B2
(45) Date of Patent: *Oct. 29, 2013

(54) COMPOSITION FOR DYEING OF CELLULOSIC FABRIC

(75) Inventors: Ruth E May, Schuylkill Haven, PA (US); Martin Bentham, Barnsley (GB)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/080,400

(22) Filed: Apr. 5, 2011

(65) Prior Publication Data

US 2011/0179588 A1    Jul. 28, 2011

Related U.S. Application Data

(60) Division of application No. 11/656,769, filed on Jan. 23, 2007, now Pat. No. 7,931,700, which is a continuation-in-part of application No. 11/338,346, filed on Jan. 24, 2006, now Pat. No. 7,931,701, which is a continuation-in-part of application No. 10/601,820, filed on Jun. 23, 2003, now Pat. No. 7,033,403, which is a continuation of application No. 10/386,161, filed on Mar. 10, 2003, now abandoned, which is a continuation-in-part of application No. 10/330,922, filed on Dec. 27, 2002, now Pat. No. 6,835,258.

(51) Int. Cl.
*C09B 67/26* (2006.01)

(52) U.S. Cl.
USPC ............. 8/543; 8/552; 8/558; 8/587; 8/115.6; 8/116.1; 8/904; 8/907; 8/908; 8/918

(58) Field of Classification Search
USPC ................. 8/499, 543, 552, 558, 587, 115.6, 8/116.1, 904, 907, 908, 918
See application file for complete search history.

(56) References Cited

U.S. PATENT DOCUMENTS

| | | | |
|---|---|---|---|
| 1,796,039 A * | 3/1931 | Mijer | 8/149.2 |
| 2,532,471 A | 12/1950 | Wedler | |
| 2,915,230 A | 12/1959 | Brewin et al. | |
| 2,974,838 A | 3/1961 | Parham | |
| 2,985,502 A | 5/1961 | Kronsbein et al. | |
| 2,990,087 A | 6/1961 | Brewin et al. | |
| 2,990,088 A | 6/1961 | Isken et al. | |
| 3,022,926 A | 2/1962 | Bailey, Jr. | |
| 3,142,423 A | 7/1964 | Carter | |
| 3,181,749 A | 5/1965 | Helliwell et al. | |
| 3,357,611 A | 12/1967 | Berger et al. | |
| 3,379,715 A * | 4/1968 | Chiddix et al. | 534/641 |
| 3,468,539 A | 9/1969 | Swindell | |
| 3,507,423 A | 4/1970 | Swindell | |
| 3,653,562 A | 4/1972 | Kronsbein | |
| 3,892,342 A | 7/1975 | Ogawa et al. | |
| 3,969,074 A | 7/1976 | Chung | |
| 3,973,902 A | 8/1976 | Zimmermann et al. | |
| 4,033,943 A * | 7/1977 | Ramanathan et al. | 534/635 |
| 4,082,504 A | 4/1978 | Von Der Eltz | |
| 4,110,117 A | 8/1978 | McLeod | |
| 4,183,233 A | 1/1980 | Brown | |
| 4,197,087 A * | 4/1980 | Ami et al. | 8/554 |
| 4,324,117 A | 4/1982 | Schwob et al. | |
| 4,345,907 A | 8/1982 | Wegele et al. | |
| 4,359,322 A | 11/1982 | Neal et al. | |
| 4,361,019 A | 11/1982 | Maund | |
| 4,415,333 A | 11/1983 | Schlafer et al. | |
| 4,483,032 A | 11/1984 | Christ et al. | |
| 4,501,038 A | 2/1985 | Otting | |
| 4,612,016 A | 9/1986 | Jaeger et al. | |
| 4,648,250 A | 3/1987 | Yabe | |
| 4,659,333 A | 4/1987 | Schaub | |
| 4,676,078 A | 6/1987 | Ramsey | |
| 4,717,391 A | 1/1988 | Daniel et al. | |
| 4,786,288 A | 11/1988 | Handa et al. | |
| 4,786,721 A | 11/1988 | Tzikas et al. | |
| 4,792,619 A | 12/1988 | Berendt et al. | |
| 4,793,014 A | 12/1988 | Luigi | |
| 5,000,756 A * | 3/1991 | Aeschlimann | 8/549 |
| 5,010,612 A | 4/1991 | Jensen et al. | |
| 5,016,308 A | 5/1991 | McBride et al. | |

(Continued)

FOREIGN PATENT DOCUMENTS

| | | |
|---|---|---|
| DE | 19633101 | 2/1998 |
| EP | 1233098 A1 | 8/2002 |
| EP | 1275700 A2 | 1/2003 |
| GB | 2265077 A | 9/1993 |
| IT | PD2001A000089 A1 | 10/2002 |
| WO | WO-8606425 A1 | 11/1986 |
| WO | WO-96/28604 | 9/1996 |
| WO | WO-2004-081118 | 9/2004 |
| WO | WO-2006105365 | 10/2006 |
| WO | WO-200787407 | 8/2007 |

OTHER PUBLICATIONS

Milliken & Company; http://www.millikencarpet.com/Millitron.html; "Milliken Millitron Injection Dye Technology"; 1998.

"Ciba Specialty Chemicals Sets New Wet Fastness Standard with Innovative Range of Carpet Dyes."www.cibasc.com/textile effects, Jun. 24, 2002.

"Spray Dyeing on Cotton and Wool Fabrics," International Dyer, Dyeing Cotton & Cellulosics, date unknown, available as of filing date.

European Patent Office, European Examination Report for EP 07762393.2 , dated Jul. 16, 2009.

US Patent Office, Examiner Timothy S. Chiang, Official Action for U.S. Appl. No. 12/371,812 dated Mar. 29, 2011.

*Primary Examiner* — Lorna M Douyon
*Assistant Examiner* — Amina Khan
(74) *Attorney, Agent, or Firm* — Womble Carlyle Sandridge & Rice LLP; Jeffrey R. McFadden

(57) ABSTRACT

A method of making a composition for spray application onto surfaces of a cotton fabric includes mixing together a wetter, a reactive dye and water to form a first solution, adding a thickener into the first solution for between about five minutes and sixty minutes to form a partial composition, and adding an alkali with the partial composition to complete the composition.

25 Claims, No Drawings

(56) References Cited

U.S. PATENT DOCUMENTS

| | | | |
|---|---|---|---|
| 5,040,475 A | 8/1991 | Fournier et al. | |
| 5,081,731 A | 1/1992 | Yamakita et al. | |
| 5,165,355 A | 11/1992 | Fournier et al. | |
| 5,205,305 A | 4/1993 | Yamakita | |
| 5,288,322 A | 2/1994 | Hanna et al. | |
| 5,393,360 A | 2/1995 | Bridges et al. | |
| 5,458,265 A | 10/1995 | Hester et al. | |
| 5,509,985 A | 4/1996 | Kock | |
| 5,512,062 A | 4/1996 | Fuller et al. | |
| 5,516,392 A | 5/1996 | Bridges et al. | |
| 5,518,566 A | 5/1996 | Bridges et al. | |
| 5,593,072 A | 1/1997 | Hester et al. | |
| 5,713,223 A | 2/1998 | Lin | |
| 5,775,136 A | 7/1998 | Chao-Cheng | |
| 5,840,084 A * | 11/1998 | Bella et al. | 8/549 |
| 5,850,651 A | 12/1998 | Ishimaru et al. | |
| 5,938,796 A * | 8/1999 | Negri et al. | 8/543 |
| 5,951,717 A | 9/1999 | Mrotzeck et al. | |
| 5,960,650 A | 10/1999 | Chi-Lung | |
| 5,964,407 A * | 10/1999 | Sandkleiva | 239/112 |
| 6,019,799 A | 2/2000 | Brown et al. | |
| 6,063,137 A | 5/2000 | Scheibli et al. | |
| 6,120,560 A | 9/2000 | Miller et al. | |
| 6,178,781 B1 | 1/2001 | Myers | |
| 6,192,521 B1 | 2/2001 | Alberts et al. | |
| 6,312,523 B1 * | 11/2001 | Caldwell et al. | 118/663 |
| 6,393,871 B1 | 5/2002 | Chiang | |
| 6,443,569 B1 | 9/2002 | Mheidle et al. | |
| 6,464,811 B1 | 10/2002 | Meier et al. | |
| 6,471,729 B1 | 10/2002 | Voth et al. | |
| 6,495,058 B1 | 12/2002 | Frankenbach et al. | |
| 6,505,486 B1 | 1/2003 | Chang | |
| 6,552,175 B2 | 4/2003 | Schmiedl et al. | |
| 6,613,103 B2 | 9/2003 | Immediato et al. | |
| 6,662,601 B2 | 12/2003 | Chang | |
| 6,797,016 B1 | 9/2004 | Schofberger et al. | |
| 6,835,258 B2 | 12/2004 | Bingham et al. | |
| 7,033,403 B2 | 4/2006 | Bentham | |
| 7,087,730 B2 | 8/2006 | Tzikas et al. | |
| 7,144,431 B2 | 12/2006 | Gardner et al. | |
| 7,214,633 B2 | 5/2007 | Sun et al. | |
| 7,799,097 B2 | 9/2010 | Abbott et al. | |
| 7,931,699 B2 | 4/2011 | May | |
| 7,931,700 B2 | 4/2011 | May et al. | |
| 7,931,701 B2 | 4/2011 | May et al. | |
| 2002/0138922 A1 | 10/2002 | Schmiedl et al. | |
| 2003/0041387 A1 | 3/2003 | Xu et al. | |
| 2003/0097721 A1 | 5/2003 | Schmiedl et al. | |
| 2003/0110573 A1 | 6/2003 | Gardner et al. | |
| 2003/0135939 A1 | 7/2003 | Sun et al. | |
| 2003/0154556 A1 | 8/2003 | Del Duca et al. | |
| 2004/0034938 A1 | 2/2004 | Rohwer et al. | |
| 2004/0123405 A1 * | 7/2004 | Bentham | 8/543 |
| 2005/0241080 A1 | 11/2005 | Tzikas et al. | |
| 2007/0002058 A1 | 1/2007 | Wittebrood | |
| 2011/0179589 A1 * | 7/2011 | May | 8/543 |

* cited by examiner

COMPOSITION FOR DYEING OF CELLULOSIC FABRIC

CROSS REFERENCE TO RELATED APPLICATIONS

This application is a divisional of U.S. application Ser. No. 11/656,769, filed Jan. 23, 2007 (now U.S. Pat. No. 7,931, 700), which is a continuation-in-part of U.S. application Ser. No. 11/338,346, filed Jan. 24, 2006 (now U.S. Pat. No. 7,931, 701), still pending, which is a continuation-in-part of U.S. application Ser. No. 10/601,820, filed Jun. 23, 2003 (now U.S. Pat. No. 7,033,403), which is a continuation of U.S. application Ser. No. 10/386,161, filed on Mar. 10, 2003, now abandoned, which is a continuation-in-part of U.S. application Ser. No. 10/330,922, filed Dec. 27, 2002 (now U.S. Pat. No. 6,835,258). All of these applications are herein incorporated by reference.

BACKGROUND OF THE INVENTION

1. Field of the Invention

The present invention relates to dyeing of cellulosic fabric. More particularly, the present invention relates to compositions for uniformly providing, preferably by spraying, a dye on both surfaces or sides of a cellulosic fabric. In a less preferred embodiment, the present invention relates to compositions having a mixture of reactive dyes, which compositions provide a uniform color on both sides of a cellulosic greige or scoured or bleached fabric, by a spray application of the composition to the fabric.

2. Description of Related Art

Today, fabrics are made from a wide-variety of natural fibers, such as cotton, synthetic fibers, or any combination thereof. The basic fabric is a greige fabric that is needed to be dyed in order to provide the desired color to the resultant fabric and/or garment. Many compositions and methods have been proposed for dyeing fabrics, however all have proven costly in material cost, as well as time.

One method, commonly referred to as yarn dyeing, involves dyeing individual fibers or yarns prior to these fibers being sewn or knitted into a fabric. One problem associated with this method is inventory control of the yarns and associated garments. For example, yarn dyeing requires the garment manufacturer to maintain a supply of the various colored yarns used in its products, which inventory increases cost.

Another dyeing method is commonly referred to as bulk dyeing. In bulk dyeing, un-dyed fibers or yarns are knitted or woven into a raw or un-dyed fabric. The raw fabric is subsequently scoured or bleached and then dyed. The dyed fabric is then used to make the desired product, such as a garment.

Some common bulk dyeing methods include vat dyeing, beam dyeing, jet dyeing, and bath dyeing. Vat dyeing typically consists of immersing a piece of fabric in a vat of liquid dye. Beam dyeing involves winding a length of fabric about a perforated beam. The beam is then placed in a vessel where liquid dye is pumped into the center of the beam, out of the perforations, and through the fabric. Jet dyeing involves placing the fabric in a high-pressure, high-temperature kettle of liquid dye. Bath dyeing involves immersing the fabric in a bath of dye, which is contained in a rotating drum.

One problem associated with such bulk dyeing methods relates to the fabric that is cut away or removed during manufacture of the fabric into the desired garment. The fabric that is cut away has been dyed and, thus, includes the cost of the dye. This can lead to an increased cost of goods for garments made from bulk dyed fabrics. Another problem with bulk dyeing methods relates to the large amounts of water required during processing, which can increase cost of goods for such bulk dyed fabrics, as well as having an adverse effect on the environment and an erosion of resources.

A more significant problem with bulk dyed fabrics in the manufacture of garments is the unpredictability of consumer color preferences. In the garment industry, change in the consumer's preference for one color over another color can lead to an overstock of the undesired colored garments and a back order situation of the desired colored garments. Thus, garments made from bulk dyed fabrics have not proven flexible enough to meet increasing and changing consumer demands.

Further methods of dyeing fabrics involve printing a dye onto a surface of a fabric. This method is commonly used to apply a decorative pattern on the surface of the fabric. Such printing methods include screen-printing and inkjet printing. While these methods have proven useful in quickly changing from one decorative pattern to another, they have not proven useful in bulk dyeing of fabrics or completed garments.

Perhaps, one of the cost effective methods of dyeing a fabric is spray dyeing. Spray dyeing, as used herein, includes conventional spraying as well as atomization and electrostatic applications. However, a problem with spray dyeing is to provide a uniform dye on both sides of the garment. Normally, to attempt to achieve such uniformity requires spray dyeing on both sides of the fabric or garment in a very controlled environment. Also, the fabric or garment must remain in a taut position in order to provide penetration into the fabric or garment yet not have any garment area that is covered or unavailable for receipt of the spray. This is difficult to achieve, let alone in a cost effective manner, especially if both sides of the garment are to be spray dyed.

Accordingly, there is a need for a composition and resultant method of dyeing cellulosic, especially greige or scoured or bleached, fabrics that provide uniform color on both sides of the fabric. It is particularly important to provide such a composition that can dye cotton to any desired color in one basic spray step or operation without the need of a controlled environment and without the problems noted above for positioning the fabric or garment, yet with good dye penetration into the fabric or garment.

SUMMARY OF THE INVENTION

The present invention provides a composition that permits spray dyeing of a cellulosic fabric or garment.

The present invention also provides a composition that permits spray dyeing of a cellulosic, such as cotton, fabric or garment, so that both sides of the garment have the same uniform color or dye.

The present invention further provides a composition that permits uniform spray dyeing of a cellulosic fabric or garment on both surfaces of the fabric or garment.

The present invention still further provides a composition that permits uniform spray dyeing of both sides or surfaces of a cellulosic fabric or garment thereby providing a more uniform dyeing throughout the fabric or garment so that the print is the same inside and on the surfaces of the fabric or garment.

The present invention yet further provides a composition that, in a less preferred embodiment, permits spray dyeing of one side of a cellulosic fabric or garment, yet provides the uniform color or dye to both surfaces of the garment.

The present invention also provides a method of making a composition that can, through spraying, uniformly dye both surfaces of a cellulosic fabric or garment.

These and other advantages and benefits of the present invention are provided by a composition that is anionic. The composition includes a wetter, an alkali, a reactive dye, water, and a thickener. In other embodiments of the present invention, the composition can include one or more of the following: a chelator, a dye leveling agent, an anti-reducing agent, a defoamer, and sodium chloride. In an earlier, less preferred embodiment, the composition includes a wetter, an alkali, a reactive dye, and water.

The present invention also provides a method for making the present compositions that includes first mixing together the wetter, chelator (if used), dye and water to form a first solution in which the dye is well dissolved or blended, then adding and mixing the thickener into the first solution to form a second solution. In a preferred embodiment, after formation of the second solution, alkali is, within thirty minutes before application of the second solution to the fabric, merged into the second solution or independently applied, preferably by spraying, along with the second solution, onto the fabric. The alkali should have a pH between about 10.5 and 11.7. The alkali is preferably a combination of soda ash, potassium carbonate and a phosphate.

The above-described and other advantages and features of the present disclosure will be appreciated and understood by those skilled in the art from the following detailed description and appended claims.

DETAILED DESCRIPTION OF THE INVENTION

The present disclosure provides a composition that can be applied to a fabric or garment (hereinafter referred to as "fabric") made of a cellulosic material. The composition provides uniform color throughout the fabric, namely on both sides or surfaces of the fabric, as well as throughout the fabric. The fabric can be a part of or the complete finished garment, such as, but not limited to, a shirt, pant, underwear, panty, sock, skirt, dress, short, coat, suit, scarf, glove, hat, and any other apparel item. Also, the fabric can be a sheet, towel, pillowcase, or any other cellulosic made material. Thus, the present compositions can efficiently and effectively color a cellulosic fabric, that cellulosic fabric can be combined with a non-cellulosic fabric to form a finished garment or the cellulosic fabric can make-up the entire finished garment.

The term cellulosic has its conventional meaning, and therefore includes cotton and fabric made of about 100 percent cotton. The cellulosic material can be greige, scoured or bleached or any combination of same.

The present compositions include a wetter or wetting agent, a reactive dye, an alkali, a thickener and water. In addition, the composition may include one or more of the following: a chelator, a dye leveling agent, a defoamer, an anti-reducing agent, and sodium chloride. In a less preferred embodiment, the composition can include a wetter, a reactive dye, a thickener and water. In the present compositions, each ingredient is anionic or non ionic.

The wetter of the present compositions acts to transports the dye into the fabric thereby assisting in locking the color into the substrate. The wetter is a blend of one or more surfactants. The surfactants provide detergent properties to the fabric. The surfactants in the blend are anionic or non-ionic. At this time, it is believed that any anionic or nonionic surfactant can be used. The preferred wetter or blend of surfactants has sulfuric acid disodium salt and phosphoric acid trisodium salt. In a less preferred embodiment, the wetter can be sodium dioctyl sulfosuccinate.

The wetter is preferably present in an amount between about 5 grams per liter (g/l) and 40 g/l based on the total g/l of the composition. More preferably, the wetter is present in an amount between about 5 g/l and 20 g/l, and most preferably about 5 g/l, based on the total g/l of the composition.

A reactive dye is used in the present compositions. The reactive dye is a cold or mid-temperature range reactive dye. The reactive dye is a dye that reacts with fibers in the fabric or garment to form a covalent bond. While many reactive dyes can be used, a reactive dye particularly suited for dyeing cellulosic fabric or fibers, such as cotton, is an azo dye, an azo metal complex and dioxazine. Preferably, the dye is an azo metal complex or dioxazine.

The reactive dye is present in an amount between 10 g/l and 80 g/l based on the total g/l of the composition. The precise dye amount is based on the color value and depth of color desired. For example, a pink color for the fabric would need between 10 g/l and 20 g/l dye based on the total g/l of the composition. If the color desired is royal blue, the dye would be between 40 g/l and 60 g/l based on the total g/l of the composition.

All embodiments of the present compositions have an alkali. The alkali of the present compositions should have a pH between about 10.5 and 11.7.

The alkali preferably is a liquid alkali. The liquid alkali preferably is a combination of soda ash, potassium carbonate and phosphate.

In another embodiment, the alkali could be a combination of a silicate, preferably a sodium silicate, and a caustic. The caustic is preferably sodium hydroxide or sodium carbonate. The caustic may be soda ash. The sodium silicate assists in bleaching the cellulosic fabric, and acts to stabilize the composition. The alkali is preferably a combination of a sodium silicate and a caustic if the fabric is a greige fabric or only a caustic, preferably, soda ash, if the fabric is a finished fabric.

In yet another embodiment for bright and light colors, the alkali is a combination of a sodium silicate and a caustic, namely soda ash. The sodium silicate and caustic are present in about a 2 to about 1 ratio. Thus, 2 parts sodium silicate warrants 1 part caustic.

The alkali, when a combination of the sodium silicate and caustic or simply solely a caustic, is present in an amount between 3 g/l and 20 g/l based on the total g/l of the composition. More preferably, the alkali is present in an amount between 5 g/l and 15 g/l based on the total g/l of the composition. For a dark color, the alkali is present in an amount about 10 g/l based on the total g/l of the composition.

The present compositions have a thickener. The thickener is important to assist in providing the levelness of color in the fabric or garment particularly during spray operations. It is believed that the thickener keeps the molecules of the dye in suspension on the fabric being sprayed. Thus, if the desired levelness of color is achieved absent the thickener, perhaps due to spray conditions, the use of a thickener can be avoided. The use of a thickener in spraying will control viscosity to ensure an even spray.

The thickener of the present compositions is an acrylic acid copolymer, an aliphatic polyester polyurethane, or a polyacrylate. The thickener can be an acrylic acid copolymer. The preferred acrylic acid copolymer has between about 2% and 3% naphthol spirits. A preferred thickener is an acrylic acid copolymer sold under the mark Acraconz FN by Lanxess Corporation of Pittsburgh, Pa. This copolymer has 7 to 13 percent ethoxylated alcohol, about 1% hexadecane, and about 1% acrylamide P/W acrylic acid ammonium salt.

The thickener is present in an amount between about 5 g/l and 50 g/l based on the total g/l of the composition. Most preferably, the thickener is present in an amount between about 5 g/l and 20 g/l based on the total g/l of the composition.

The present compositions each have water in a q.s. amount.

Optionally, the present compositions can have one or more of the following ingredients. The first such optional ingredient is a chelator. The chelator is, like all other ingredients of the present compositions, an anionic or a non ionic ingredient. The chelator must be a stable to high alkali for the purposes of the present compositions. The chelator is used to remove hard metals from the water and prevents precipitation that leads to unevenness of the color. It can also assist in stabilizing the dye bath. Thus, a chelator may not be needed in the present compositions if no minerals, such as hard metals, are present in the fabric or garment or in the water source. Chelators that can be used in the present compositions include, but are not limited to, a blend of amino acid derivatives or pentasodium salt of diethlenetriaminepenta acetic acid.

When present, the chelator is preferably present in an amount between about 1 g/l and 40 g/l based on the total of the composition. More preferably, the chelator is present in an amount between about 1 g/l and 20 g/l, and most preferably about 6 g/l, based on the total g/l of the composition.

The optional dye leveling agent is used to provide uniformity for the dye in the composition. Thus, if the desired uniformity is achieved by the composition itself alone or in combination with the spray method used, the dye leveling agent is not needed. In the present compositions, a dye leveling agent does not appear to be needed due to the thickener. However, the present disclosure envisions the possibility that there are situations in which the dye leveling agent could be used.

The present compositions can optionally have a defoamer. The defoamer acts to eliminate non-aerated liquid that is desired when a spray is used to apply the present compositions. Defoamers that can be used in the present compositions include, but are not limited to, petroleum distillate blend, organosilicone, petroleum distillate, hydrocarbon or reacted silicone. A preferred defoamer is a petroleum distillate blend. The defoamer is preferably present in an amount between about 0.1% g/l and 0.5% based on the total g/l of the composition.

The present compositions can optionally have an anti-reducing agent.

The present compositions can be formulated and applied according to the following method in order to enhance the efficacy of the composition. First, the wetter, chelator if included, dye and water are mixed together to form a first solution that has the dye well dissolved or blended therein. Second, the thickener should be added and mixed, preferably in a high speed mixer, into the first solution to form a second solution. The high speed mixer is needed to shear the thickener into the blend. This high speed mixing should be for between about five (5) minutes and one (1) hour. Thereafter, the alkali can be mixed into the second solution. Alternatively, the alkali can be independent and merged or mixed at the spray head with the second solution.

Within thirty (30) minutes after the alkali is mixed into or merged with the second solution, the composition must be applied to the cellulosic fabric. It is important that the alkali is merged, mixed or blended with the second solution within the thirty minutes of application to the fabric or garment since beyond thirty minutes the dye molecules may hydrolyze.

Another method for application of the present composition to the fabric is simultaneously all ingredients are mixed, preferably in an in-line, spray head. For example, each ingredient moves to a sleeve having a corkscrew therein to mix together all ingredients and then move into the spray head to emit the composite present composition onto the fabric.

The composition is sprayed on the surfaces or sides of a fabric using any spray nozzle. Preferably, the spray nozzle is movable with respect to each surface or side of the fabric so that a substantially even coat of the composition is applied to the surfaces of fabric. One preferred method of spray dyeing is disclosed in U.S. patent application Ser. No. 10/601,820, filed Jun. 23, 2003 (now U.S. Pat. No. 7,033,403), which is incorporated herein by reference.

Advantageously, the composition can be applied by spraying onto the two surfaces or sides of the fabric in between about one (1) and twenty (20) seconds, and preferably in between about five (5) and twenty (20) seconds. Of course, this time depends on the size of the fabric, with a larger-in-size fabric expected to take more and smaller-in-size fabric expected to take less time of the aforementioned time ranges.

It should be recognized that the present invention contemplates any number of spray nozzles and any positioning of same. Also, the size of the head of a spray nozzle may vary.

Advantageously, the present compositions apply and affix to the fabric in a time effective, efficient manner. Accordingly, the cost of a garment will be reduced as compared to all known present dye methods.

Thus, the present compositions, that avoid the use of a controlled environment and provide an ability to dye all cellulosic fabrics including greige, scoured and bleached, facilitates manufacturing flexibility in that rapid changeover from one color to another color can easily be achieved. This is a significant benefit to a manufacturer since it minimizes or virtually eliminates inventory control costs and problems associated with the pre-dyed yarns and pre-dyed garments of prior processes.

Other benefits of the compositions of the present disclosure include that the amount of water consumption is reduced from known methods of spray dyeing. Also, the amount of dye used is less than known methods since the dye applied to the surfaces penetrates more easily and readily than any known composition. Thus, less dye is needed to achieve complete dyeing. Another benefit achieved by the use of the present compositions to spray dye cellulosic fabrics is that one can effectively and efficiently manufacture small runs of certain color dye fabrics.

It is contemplated, but in a less preferred embodiment, that if the present composition is sprayed onto only one side or surface of the cellulosic material and by the use of spraying and a mixture of reactive dyes in the composition, the composition may penetrate through the entire cellulosic material and onto the other side or surface. It is believed that a mixture of reactive dyes, namely two or more reactive dyes as defined above, and good spray conditions, will provide a good uniform dye through and on both sides of the cellulosic material even though sprayed onto only one surface of the cellulosic material.

A benefit of the application of the present compositions to fabric is that the fabric has great shrinkage almost analogous to that inherent in the fabric. Obtaining such shrinkage by the application of the present compositions reduces subsequent shrinkage. Reducing subsequent shrinkage will improve the characteristics of the fabric.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the scope thereof. Therefore, it is intended that the present disclosure not be limited to the particular embodiment(s) disclosed as the best mode contemplated for carrying out this invention, but that this disclosure will include all embodiments falling within the scope of the appended claims.

The invention claimed is:

1. A method of making a solution for spray application onto surfaces of a cotton fabric, consisting of:
 mixing together a wetter, a reactive dye and water to form a solution, the wetter being selected from the group consisting of a first surfactant, wherein the first surfactant is a blend of sulfuric acid disodium salt and phosphoric acid trisodium salt, and a second surfactant, wherein the second surfactant is sodium dioctyl sulfosuccinate;
 adding a thickener to the solution; and
 adding an alkali to the solution at a time that allows spray application of the solution onto the surfaces of a cotton fabric before the reactive dye hydrolyzes, the alkali being selected from the group consisting of a first combination of soda ash, potassium carbonate and phosphate, and a second combination of sodium silicate and a caustic.

2. The method of claim 1, wherein the wetter, the reactive dye, the thickener, and the alkali are anionic or non-ionic.

3. The method of claim 1, wherein the wetter is added in an amount between 5 g/l and 40 g/l.

4. The method of claim 1, wherein the reactive dye is an azo metal complex or dioxazine.

5. The method of claim 4, wherein the reactive dye is added in an amount between 10 g/l and 80 g/l.

6. The method of claim 1, wherein the step of adding the thickener is blending the thickener into the solution at a high speed.

7. The method of claim 6, wherein the thickener is blended into the solution for between 5 minutes and 60 minutes.

8. The method of claim 7, wherein the thickener is added in an amount between 5 g/l and 50 g/l.

9. The method of claim 8, wherein the thickener is an acrylic acid copolymer.

10. The method of claim 9, wherein the acrylic copolymer has between 2 percent and 3 percent napthal spirits.

11. The method of claim 1, wherein the alkali is added in an amount between 3 g/l and 20 g/l.

12. The method of claim 11, wherein the alkali has a pH between 10.5 and 11.7.

13. A method of making and applying a solution for spray application onto surfaces of a cotton fabric, consisting of:
 mixing together a wetter, a reactive dye, a thickener, an alkali, and water in an in-line sleeve to form a solution;
 the wetter being selected from the group consisting of a first surfactant, wherein the first surfactant is a blend of sulfuric acid disodium salt and phosphoric acid trisodium salt, and a second surfactant, wherein the second surfactant is sodium dioctyl sulfosuccinate;
 the alkali being selected from the group consisting of a first combination of soda ash, potassium carbonate and phosphate, and a second combination of sodium silicate and a caustic; and
 moving the solution from the in-line sleeve to a spray head for application of the solution onto the surfaces of the cotton fabric before the reactive dye hydrolyzes.

14. The method of claim 13, wherein the in-line sleeve has a mixer therein.

15. The method of claim 14, wherein the mixer is a corkscrew configuration.

16. The method of claim 13, wherein application onto the fabric is spraying two sides of the fabric between 5 and 20 seconds.

17. The method of claim 13, wherein the wetter, the reactive dye, the thickener, and the alkali are anionic or non-ionic.

18. The method of claim 13, wherein the wetter is added in an amount between 5 g/l and 40 g/l.

19. The method of claim 13, wherein the reactive dye is an azo metal complex or dioxazine.

20. The method of claim 19, wherein the reactive dye is added in an amount between 10 g/l and 80 g/l.

21. The method of claim 13, wherein the thickener is added in an amount between 5 g/l and 50 g/l.

22. The method of claim 21, wherein the thickener is an acrylic acid copolymer.

23. The method of claim 22 wherein the acrylic copolymer has between 2 percent and 3 percent napthal spirits.

24. The method of claim 13, wherein the alkali is added in an amount between 3 g/l and 20 g/l.

25. The method of claim 24, wherein the alkali has a pH between 10.5 and 11.7.

* * * * *